United States Patent [19]

Neufeld

[11] 4,345,728

[45] Aug. 24, 1982

[54] METHOD FOR CONTROLLING THE ATTITUDE OF A SPINNING SPACECRAFT IN THE PRESENCE OF SOLAR PRESSURE

[75] Inventor: Murray J. Neufeld, Studio City, Calif.

[73] Assignee: Hughes Aircraft Company, Culver City, Calif.

[21] Appl. No.: 71,646

[22] Filed: Sep. 4, 1979

Related U.S. Application Data

[60] Division of Ser. No. 880,929, Feb. 24, 1978, abandoned, which is a continuation of Ser. No. 660,089, Feb. 23, 1976, abandoned, which is a division of Ser. No. 551,206, Feb. 19, 1975, Pat. No. 3,996,804.

[51] Int. Cl.³ .............................................. B64G 1/24
[52] U.S. Cl. .................................... 244/168; 244/164
[58] Field of Search .............. 244/158, 164, 167, 168, 244/169, 171, 172, 173

[56] References Cited

U.S. PATENT DOCUMENTS

| | | | |
|---|---|---|---|
| 3,206,141 | 9/1965 | Dryden | 244/169 |
| 3,226,062 | 12/1965 | Davis | 244/168 |
| 3,516,623 | 6/1970 | Sinden | 244/169 |
| 3,640,487 | 2/1972 | Wanger | 244/167 |

OTHER PUBLICATIONS

K. R. Lorell et al., "An Automatic Mass-Trim System for Spinning Spacecraft", Aug. 1972, AIAA Journal, vol. 10, No. 8, pp. 1012 to 1015.

Primary Examiner—Charles E. Frankfort
Attorney, Agent, or Firm—Noel B. Hammond; W. H. MacAllister

[57] ABSTRACT

The torque from differential solar pressure acting on a spinning spacecraft body and tending to tilt the spacecraft about an axis transverse to the spin axis, is reduced or eliminated by shifting the center of gravity of the spacecraft axially or longitudinally of the spin axis in a direction toward the center of solar pressure.

3 Claims, 5 Drawing Figures

METHOD FOR CONTROLLING THE ATTITUDE OF A SPINNING SPACECRAFT IN THE PRESENCE OF SOLAR PRESSURE

This application is a division of application Ser. No. 880,929, filed Feb. 24, 1978 (now abandoned in favor of application Ser. No. 184,866, filed Sept. 8, 1980), which was a continuation of application Ser. No. 660,089, filed Feb. 23, 1976 now abandoned, which was a division of application Ser. No. 551,206, filed Feb. 19, 1975, now U.S. Pat. No. 3,996,804.

FIELD OF THE INVENTION

This invention relates to control systems and more specifically to control systems for spinning bodies.

DESCRIPTION OF THE PRIOR ART

In present communication satellites with their narrow beam high gain antennas and associated pointing accuracy requirements, the control and stability of the spacecraft's attitude is of extreme importance. There exists in the prior art several means and methods of controlling and stabilizing the spacecraft's attitude.

Dynamic balance is important in spinning spacecraft in maintaining attitude. Dynamic imbalance causes the spacecraft to wobble at spin frequency thereby deleteriously affecting the communication channel. To reduce the effects of dynamic imbalance, spacecrafts are dynamically balanced during ground test. However, no matter how well dynamic balance is achieved during ground test, there is always some dynamic imbalance present in the spacecraft after ascent to its designated in-orbit position. Dynamic imbalance can be introduced by the char distribution in the apogee motor or by expending a portion of the liquid fuel for the thrusters.

The first step in eliminating dynamic imbalance is the step of determining the phase and magnitude of the dynamic imbalance. There does exist in the prior art several means for measuring the dynamic imbalance so that it can be eliminated. These means include such things as accelerometers and gyroscopes mounted in the spacecraft. These devices directly sense the dynamic imbalance and the information from them is transmitted to an earth station for analysis. Since this type of direct sensing of the dynamic imbalance requires longlived reliable components and adds to the weight of the spacecraft, it is an undesirable method.

Therefore, methods have been developed which are done remotely in a maintainable ground environment and do not add to the weight of the spacecraft. These include an interferometer method and an FM method.

The interferometer method requires that the spacecraft have two antennas separated axially a known distance. The two signals from the two antennas are received on a single receiver and antenna. From the variation in the interference pattern of the two received signals, the wobble angle magnitude and phase is calculated. This method is disadvantageous because it can only be utilized with spacecraft having two antennas separated axially. Furthermore, the measurement of the variation in the interference pattern requires very complex equipment. Also, the calculations required are relatively complex to determine the wobble angle.

The FM method measures the amount of frequency modulation present on the received signal as a result of the wobble. From the frequency modulation measurements, the wobble angle can be calculated. Since the wobble angle is typically very small, the amount of frequency modulation is very small and requires very sophisticated equipment to detect and measure. Also, the calculations required are complicated by the need to separate the FM component due to static unbalance from the FM component of the dynamic imbalance.

Another important effect upon spacecraft attitude is caused by solar pressure. This low level torque only manifests itself after the spacecraft is in orbit. Since solar pressure is a low-level in-flight force, it cannot be practically measured during ground testing and can only be predicted based upon a mathematical model. Presently, solar pressure is compensated for by designing the spacecraft surface and mass properties such that the predicted solar torque from the mathematical model has a minimal effect upon the spacecraft attitude in flight. Since this method is based upon a mathematical model which can be incorrect, it is not a satisfactory solution.

It is an object of the present invention to compensate the affects of differential solar pressure upon a spinning spacecraft in flight.

SUMMARY OF THE INVENTION

In practicing the present invention, a spinning spacecraft is provided having a dynamic balancer, a master index pulse generator, a sun sensor, an earth sensor, a radially displaced axial thruster and an antenna system forming part of a communications channel between the spacecraft and the ground receiving and transmitting terminal. The ground terminal detects the amplitude of the spin frequency component of the rf signal emanating from the spacecraft antenna. This modulation of the amplitude of the rf carrier is useful in determining the wobble angle of the spacecraft, and, in conjunction with the master index pulse, indicates the phase of the wobble angle. The dynamic balancer is now useful in eliminating the wobble angle by shifting one or more of the balancer weights in axial directions in fixed radial positions to dynamically balance the body. For spin rate control the dynamic balancer is used to dynamically unbalance the body and the axial thruster fired to introduce a spin-rate-changing torque in a sense to achieve the desired spin rate. Details of these features useful in further understanding this invention are found in parent U.S. Pat. No. 3,996,804, the teachings of which are incorporated herein by reference.

To change the center of gravity of the spacecraft thereby minimizing or compensating for the effects of solar pressure, the dynamic balancing means must be of the type which comprises a plurality of axially movable masses. To change the center of gravity, the axially movable masses are moved in unison in either axial direction thereby shifting the center of gravity of the spacecraft in that direction. The direction of movement is chosen to be toward the center of solar pressure. Therefore, as the center of gravity moves closer to the center of solar pressure, the moment arm between the center of gravity and the center of solar pressure is decreased thereby reducing the solar torque, as a result of differential solar pressure, about the center of gravity of the spacecraft.

BRIEF DESCRIPTION OF THE DRAWINGS

The above-mentioned and other features and objects of the present invention will become more apparent by reference to the following description taken in conjunc

DESCRIPTION OF THE PREFERRED EMBODIMENTS

Figure 1:
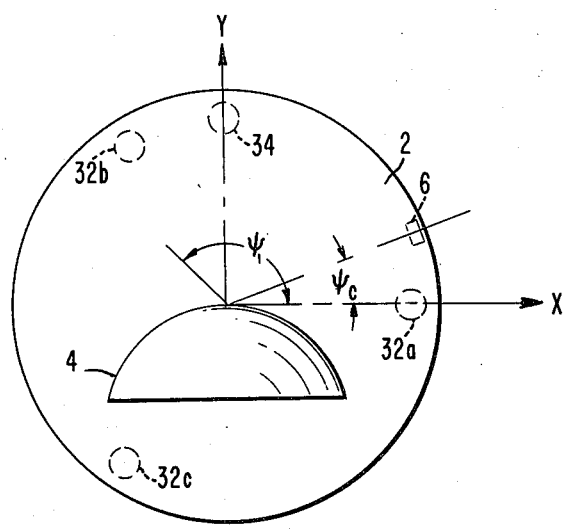
- FIG. 1 is a plan view of a spinning body in accordance with the teachings of the present invention.
Figure 2:
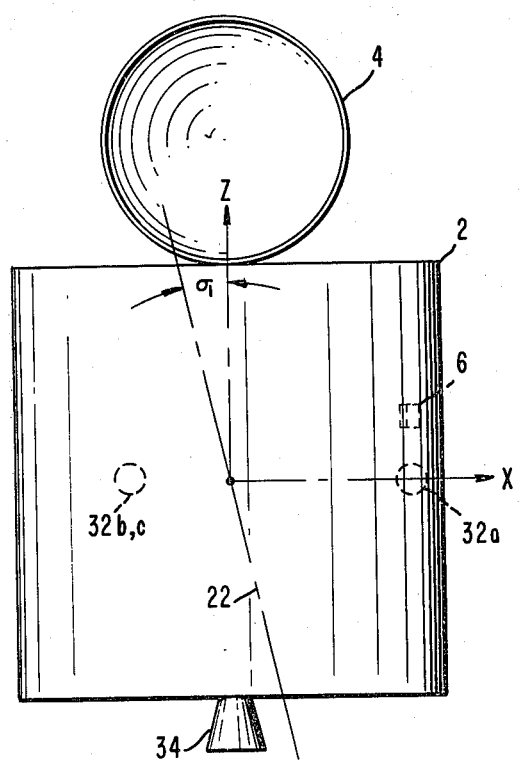
FIG. 2 is an elevation view of a spinning body in accordance with the teachings of the present invention.
Figure 4:
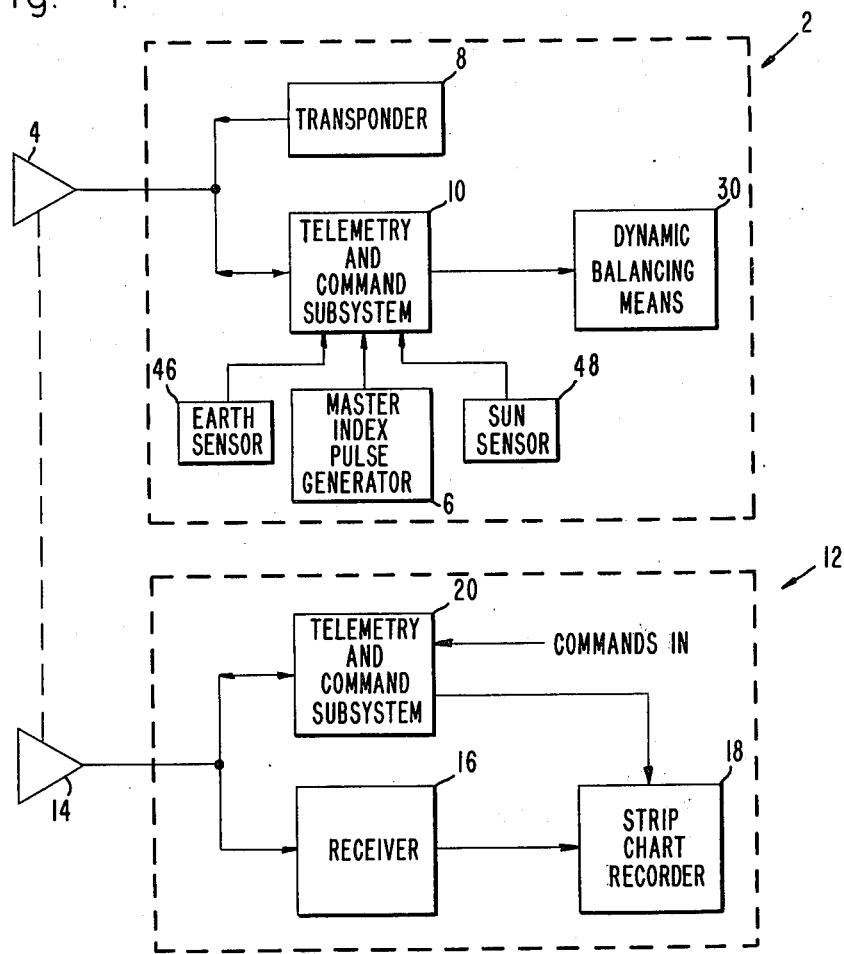
FIG. 4 is a simplified block diagram of a control loop in accordance with the teachings of the present invention.

Referring more specifically to the drawings, FIGS. 1 and 2 are respectively a plan view and an elevation view of a body in accordance with the teachings of the present invention. FIG. 4 is a simplified block diagram of a control loop in accordance with the teachings of the present invention. FIG. 1, FIG. 2 and FIG. 4 taken together, contain sufficient detail to set forth one embodiment of the present invention.

Referring to FIG. 1, FIG. 2 and FIG. 4, the body 2 has mounted thereon an antenna 4. In operation the antenna 4 is despun and remains in a fixed angular position relative to some point external to the body 2 as it spins, and radiates electromagnetic wave energy generated by communications channel transponder 8. The radiated energy or signal is received by an antenna 14 located at a ground terminal 12. The received signal amplitude is detected by a narrow band receiver 16 located at the terminal 12. The output of the receiver 16 is applied to an input of a dual trace strip chart recorder 18. The recorder 18 is calibrated in decibels.

The body 2 also contains a master index pulse generator 6. This index pulse generator 6 produces an index pulse once each spin period of the body 2. This index pulse is transmitted to the ground terminal 12 by a telemetry and command subsystem 10. The transmitted index pulse is received and detected by a telemetry and command subsystem 20 located at the terminal 12, having an output which couples or applies the master index pulse to the other input of the strip chart recorder 18.

In practice, the telemetry and command subsystem 10 contains a standard telemetry transmitter and modulator. The subsystem 10 further contains a standard command receiver and command demodulator. Also, the master index pulse generator 6 can be a magnet mounted on the despun antenna 4 and a coil mounted on the spinning body 2. The telemetry and command subsystem 20 contains a standard telemetry receiver and demodulator and a command modulator and transmitter.

To facilitate understanding of the present invention, a stationary three-dimensional coordinate system on the body is established. The Z axis is colinear with the central axis of spinning body 2. The X axis passes through the center of gravity of body 2 and dynamic balancing means 32a in FIGS. 1 and 2 and is perpendicular to the Z axis. The Y axis passes through the center of gravity of body 2 and is perpendicular to both the Y axis and Z axis.

Figure 3:
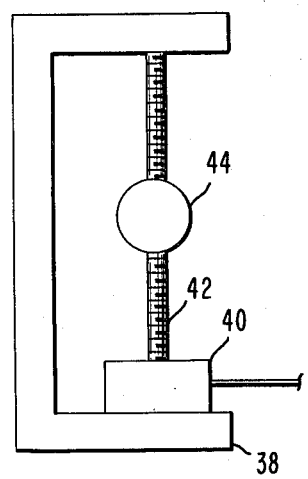
FIG. 3 is a specific implementation of a dynamic balancing means utilized in FIG. 1 and FIG. 2.

Dynamic balancing means 30 (FIG. 4) comprises a plurality of axially movable masses 32 (FIG. 1, 32a, 32b, and 32c) equidistant from each other. In practice, the axially movable masses 32 can be as shown in FIG. 3.

Each movable mass arrangement 32 comprises a frame 38 having a reversible electric motor 40 mounted therein. The reversible motor 40 drives a threaded shaft 42 having a threaded mass 44 thereon. Therefore, as motor 40 rotates, mass 44 moves either up or down threaded shaft 42.

To further facilitate the understanding of the present invention, certain assumptions must be made. The master index pulse generator 6 initiates a pulse once each spin period and at an angular location of $\psi_c$ degrees from the X axis. The antenna 4 has a known gain slope characteristic expressed in units of decibels per degree. The body 2 is initially dynamically unbalanced with an apparent principal axis 22 at an unknown angle magnitude of $\sigma_1$ degrees to the Z axis and at an unknown phase angle of $\psi_1$ degrees relative to the X axis.

Figure 5:
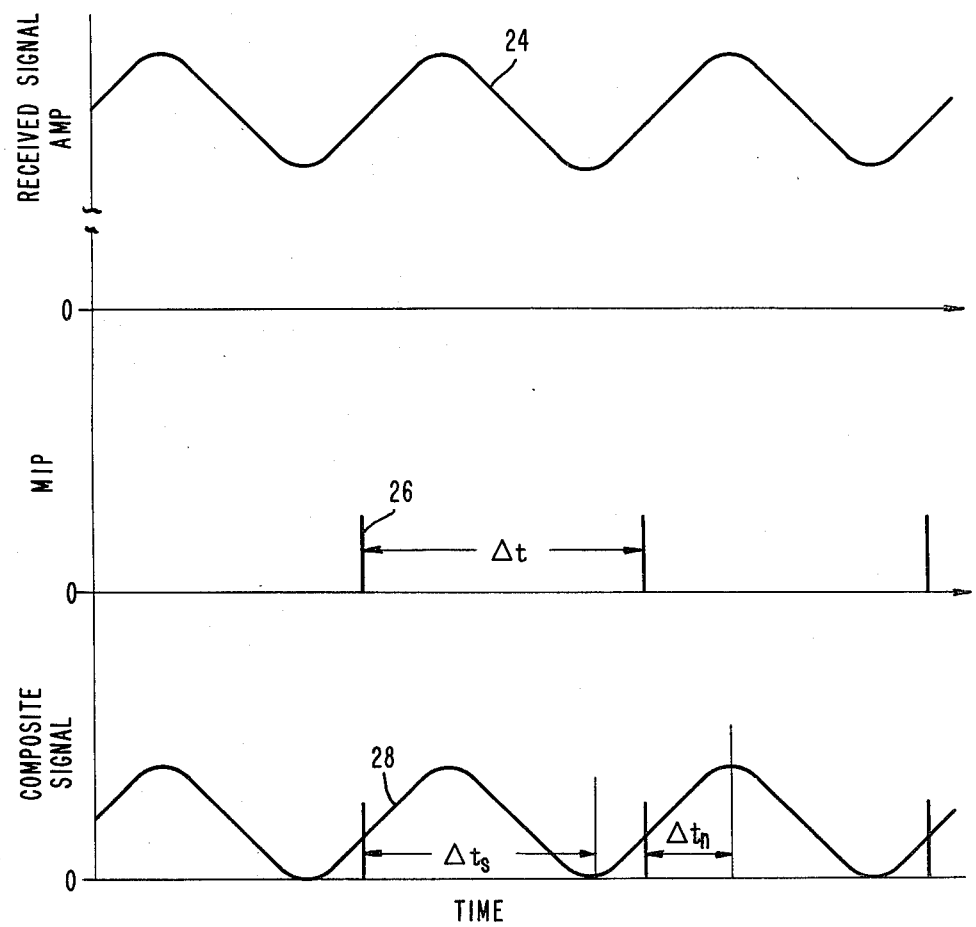
FIG. 5 is a graphic representation of typical waveforms of the strip chart recorder forming part of FIG. 4.

In practice, to measure the magnitude $\sigma_1$ and the phase $\psi_1$ of the dynamic imbalance, the attitude of the spinning body 2 is slightly altered by commands from terminal 12 such that the bore sight of antenna 4 is either north or south of antenna 14 of terminal 12. The received amplitude variation in the signal is plotted on the strip chart recorder 18 as a function of time. The waveform 24 shown in FIG. 5 is a graphical representation of such a plot. The master index pulses received by the telemetry and command subsystem 20 are also plotted on the recorder 18 as a function of time. The waveform 26 shown in FIG. 5 is a graphical representation of such a plot.

To calculate the magnitude $\sigma_1$, the peak-to-peak variation in the waveform 24 is measured. The result is divided by twice the gain slope characteristic of that portion of the beam of the antenna 4 illuminating ground terminal 12.

To calculate the phase $\psi_1$, the waveform 26 is superimposed onto the waveform 24 to form a waveform 28 as shown in FIG. 5. The time interval $\Delta t$ between the master index pulses is then measured. This interval $\Delta t$ corresponds to the spin period of the body 2. Then, if the terminal 12 receives energy from the northern part of the beam from antenna 4, the time interval $\Delta t_N$ from one master index pulse to the next maximum amplitude in the waveform 28 is measured. If the terminal 12 receives energy from the southern part of the beam from the antenna 4, the time interval $\Delta t_S$ from the master index pulse to the next minimum amplitude in the waveform 28 is measured. The phase $\psi_1$ is equal to $\Delta t_S$ or $\Delta t_N$ divided by $\Delta t$ the quantity times three hundred sixty degrees (360°) plus $\psi_c$. It should be apparent to one skilled in the art that either an earth pulse from the earth sensor 46 or a sun pulse from the sun sensor 48 could be used in lieu of the master index pulse without departing from the spirit and scope of the invention. It should also be apparent that the method of determining the magnitude $\sigma_1$ could be applied to non-spinning bodies which are subject to a rocking or wobbling motion.

to complete the dynamic balancing of the spinning body, balancing commands are developed from the magnitude $\sigma_1$ and phase $\psi_1$. These commands are applied to the command subsystem 20 and are transmitted to spinning body 2. These commands are received by the command subsystem 10 and are demodulated into signals which are applied to the dynamic balancing means 30 thereby dynamically balancing the spinning body. Since the communications channel is used to measure the imbalance, it should be apparent that this method optimizes the communication channel performance.

The parent U.S. Pat. No. 3,996,804 also discloses techniques for achieving spin rate control utilizing, among other things, the dynamic balancer and an axially disposed attitude control thruster. To the extent that these techniques are an aid to one in understanding this invention, reference may be had to the parent patent.

In correcting attitude disturbing of the spacecraft caused by incident solar pressure, the axially movable masses 32 are utilized to shift the center of gravity of the spinning body 2 in a direction to reduce or eliminate the torque due to differential solar pressure. To accomplish this phase of attitude control, the position of the center of solar pressure relative to the center of gravity of the spinning body 2 must be determined. To determine the position of the center of solar pressure, the attitude of the spinning body must be determined at two different times. The attitude at each time is developed from the earth sensor 46 and sun sensor 48 information transmitted by the telemetry and command subsystem 10 to terminal 12. Once the two spin axis attitudes are known (e.g., in an inertial coordinate system), it can be determined if the end of the spinning body 2 at antenna 4 is tipping counterclockwise or clockwise as viewed from the sun by comparing the two attitudes. If tipping counterclockwise, the center of solar pressure is axially closer to the end of the body 2 at antenna 4 than the center of gravity. If tipping clockwise, the center of pressure is axially farther from the end of body 2 at antenna 4 than the center of gravity. Therefore, once the axial direction is known, all of the movable masses 32 can be axially moved in unison in that axial direction, thereby shifting the center of gravity closer to the center of pressure. If the center of gravity is moved closer to the center of pressure, the affects the solar pressure can be reduced.

In all cases it is understood that the above-described embodiments are merely illustrative of but a small number of the many possible specific embodiments which can represent applications of the principles of the present invention. Numerous and varied other arrangements can be readily devised in accordance with these principles by those skilled in the art without departing from the spirit and scope of the invention.

What is claimed is:
1. Method for compensating for the affects of solar pressure upon a spinning body comprising the ordered steps of:
   determining the axial location of the center of solar pressure relative to the center of gravity of the spinning body; and
   shifting the center of gravity of the spinning body in the axial direction of said center of solar pressure, to thereby reduce the affects of attitude changing torques inducted by solar radiation.
2. A method for compensating for the affects of solar pressure upon a spinning body comprising the steps of:
   determining the attitude of said spinning body at a first particular time;
   determining the attitude of said spinning body at a second particular time;
   utilizing said attitudes to determine the axial location of the center of solar pressure relative to the center of gravity of said spinning body; and
   shifting the center of gravity axially of the spinning body in the direction of the center of solar pressure, to thereby reduce the affects of attitude changing torques induced by solar radiation.
3. The method of compensating the affect of solar pressure on the attitude of a spinning spacecraft operating in space and having mounted thereon, a dynamic balancer, a sun sensor and an earth sensor, comprising the steps of:
   using said sun sensor and said earth sensor at a first particular time to determine a first spacecraft attitude;
   using said sun sensor and said earth sensor at a second particular time to determine a second spacecraft attitude;
   using said first attitude and said second attitude to determine the direction of the center of solar pressure from the present center of gravity of said spacecraft; and
   thereafter adjusting said dynamic balancer in a direction longitudinally of said spinning spacecraft to solely shift the center of gravity toward the center of solar pressure acting on said spacecraft, thereby reducing the affect of attitude changing torques induced by solar pressure.

* * * * *